United States Patent [19]

Rapson et al.

[11] 4,075,308
[45] Feb. 21, 1978

[54] PRODUCTION OF CHLORINE DIOXIDE AT HIGH EFFICIENCY

[75] Inventors: W. Howard Rapson, Scarborough; Maurice C. J. Fredette, Mississauga; Norman W. Meyers, Islington, all of Canada

[73] Assignee: Erco Industries Limited, Islington, Canada

[21] Appl. No.: 770,359

[22] Filed: Feb. 22, 1977

[30] Foreign Application Priority Data

Feb. 24, 1976 United Kingdom ............... 7188/76
Aug. 24, 1976 United Kingdom ............. 35159/76

[51] Int. Cl.$^2$ .............. C01B 11/02; C01D 3/04; C01B 1/02; C01B 7/01
[52] U.S. Cl. ..................... 423/478; 423/481; 423/499; 423/500; 423/507; 423/596; 423/648 R
[58] Field of Search ............ 423/478, 499, 507, 481, 423/648, 500, 596

[56] References Cited

U.S. PATENT DOCUMENTS

| | | |
|---|---|---|
| 3,404,952 | 10/1968 | Westerlund .................. 423/478 |
| 3,563,702 | 2/1971 | Partridge et al. ............. 423/478 |
| 3,925,540 | 12/1975 | Hatherly ................. 423/478 X |
| 3,929,974 | 12/1975 | Winfield ................. 423/499 X |

FOREIGN PATENT DOCUMENTS 913,328 10/1972 Canada ...................... 423/478

*Primary Examiner*—Edward Stern
*Attorney, Agent, or Firm*—Sim & McBurney

[57] ABSTRACT

Chlorine dioxide is produced in a continuous process by reaction of sodium chlorate and hydrochloric acid. The reaction medium is maintained at its boiling point under subatmospheric pressure and the resulting steam is used to dilute the chlorine dioxide and chlorine and remove the same from the reaction zone. Sodium chloride is deposited from the reaction medium in the reaction zone. The mole ratio of chlorate to chloride in the reaction medium, and the temperature of the reaction medium are controlled within narrow limits to provide high efficiency of production of chlorine dioxide.

10 Claims, 6 Drawing Figures

PRODUCTION OF CHLORINE DIOXIDE AT HIGH EFFICIENCY

FIELD OF THE INVENTION

This invention relates to the formation of chlorine dioxide at high efficiency.

BACKGROUND OF THE INVENTION

It is known from Canadian Pat. No. 913,328 to produce chlorine dioxide by the reduction of sodium chlorate with chloride ions in an acid aqueous reaction medium in which the chloride ions and the acidity are introduced by hydrochloric acid.

This prior art procedure may be carried out in a continuous manner with the reaction medium being maintained at its boiling point at the absolute pressure thereon while the reaction zone is maintained under a subatmospheric pressure, typically in the range of about 20 to about 400 mm Hg. The boiling temperature, which is maintained below that above which substantial decomposition of chlorine dioxide occurs, results in the evaporation of water from the reaction medium, the evaporated water acting as the diluent gas for the chlorine dioxide and chlorine. Sufficient water is evaporated from the reaction medium to balance the water introduced with the reactants and formed in the reaction medium, so that the liquid level in the reaction zone is maintained substantially constant.

After start up, the reaction medium becomes saturated with by-product sodium chloride and this sodium chloride precipitates from the reaction medium. Under the steady state conditions of the continuous operation, sodium chloride continues to precipitate as the reaction progresses and is removed, continuously or intermittently, from the reaction zone.

Two competing reactions occur in the reaction medium, in accordance with the following equations (1) and (2):

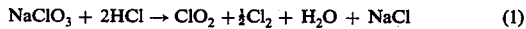

$$NaClO_3 + 2HCl \rightarrow ClO_2 + \tfrac{1}{2}Cl_2 + H_2O + NaCl \quad (1)$$

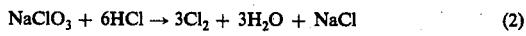

$$NaClO_3 + 6HCl \rightarrow 3Cl_2 + 3H_2O + NaCl \quad (2)$$

The efficiency of conversion of sodium chlorate to chlorine dioxide is determined by the extent to which reaction according to equation (1) predominates over reaction according to equation (2), since no chlorine dioxide is formed by the latter reaction. The production of chlorine dioxide at high efficiency depends therefore on the extent to which reaction according to equation (1) can be made to predominate over reaction according to equation (2).

SUMMARY OF THE INVENTION

The present invention is directed to the production of chlorine dioxide from sodium chlorate in accordance with the continuous procedure outlined above and disclosed in Canadian Pat. No. 913,328 at high efficiency by controlling certain operating parameters of the chlorine dioxide-producing reaction medium within carefully-controlled limits, as set forth in detail below.

DETAILED DESCRIPTION OF INVENTION

The deposition of the sodium chloride from the reaction medium under the steady state conditions of the continuous operation at the prevailing temperature of operation results since the reaction medium is saturated with respect to sodium chloride. Thus, there is a fixed concentration of sodium chloride in the sodium chlorate- and hydrochloric acid-containing reaction medium for a particular set of operating conditions. The actual solubility of the sodium chloride and hence its concentration depends on the temperature of the reaction medium, on the concentration of sodium chlorate present in the reaction medium and on the actual hydrogen ion concentration in the reaction medium, as defined below.

At a given temperature, the solubility of sodium chloride decreases with increasing concentration of sodium chlorate up to a point where the reaction medium is saturated with respect to both sodium chlorate and sodium chloride. The point of saturation of the solution with sodium chlorate, which may be termed a "eutectic" point, also corresponds to the minimum concentration of dissolved sodium chloride possible at the prevailing temperature and actual hydrogen ion concentration and hence the maximum molar ratio of chlorate ions to chloride ions in the reaction medium.

It has been found that as the mole ratio of chlorate ion to chloride ion in the reaction medium varies, the degree of conversion of sodium chlorate to chlorine dioxide and chlorine dioxide and chlorine in accordance with the reaction of equation (1) as opposed to conversion of sodium chlorate to chlorine in accordance with the reaction of equation (2) varies. Thus, the "efficiency" of the reaction and the "Gram Atom Percent" chlorine dioxide in the mixture of chlorine dioxide and chlorine produced in the reaction medium varies with the mole ratio of chlorate ion to chloride ion therein, the efficiency increasing with increasing chlorate to chloride mole ratio.

The term "Gram Atom Percent Chlorine Dioxide" (or G.A.% $ClO_2$) is a quantitative expression related to the efficiency of conversion of sodium chlorate to chlorine dioxide and chlorine by the reaction of equation (1) and refers to the quantity of chlorine atoms formed as chlorine dioxide as a percentage of the total quantity of chlorine atoms formed in a particular gas mixture. Thus:

$$G.A.\% \; [(ClO_2 = Cl \; in \; ClO_2)/Cl \; in \; ClO_2 + Cl \; in \; Cl_2)\,] \times 100 \quad (3)$$

Figure 3:
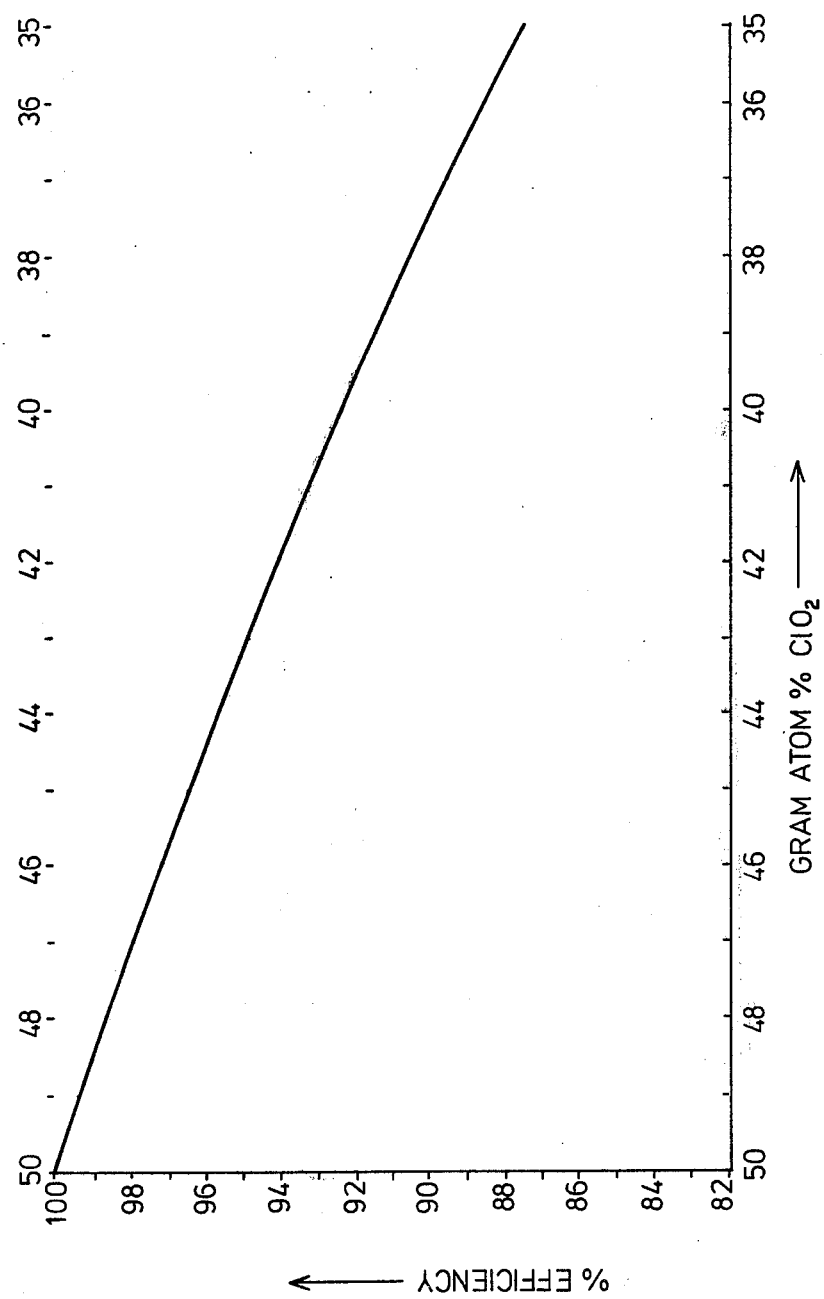
FIG. 3 is a graphical representation of the relationship of Gram Atom % $ClO_2$ and efficiency.

It follows from this equation (3) that the maximum gram atom percent chlorine dioxide obtainable is 50%, which is equivalent to an efficiency of 100%, i.e. in the case where all reduction of chlorate by the hydrochloric acid occurs by the reaction of equation (1). The relationship between efficiency and G.A.% $ClO_2$ is illustrated in FIG. 3 of the accompanying drawing.

As mentioned above, as the chlorate to chloride molar ratio in the reaction medium increases, the gram atom percent chlorine dioxide formed increases. Since the mole ratio of chlorate to chloride increases with increasing chlorate concentration up to the eutectic point, operation of the reaction medium at the maximum solubility of sodium chlorate and sodium chloride, i.e. at the maximum mole ratio of chlorate to chloride ions, results in as high an efficiency of conversion of sodium chlorate to chlorine dioxide as is possible at the prevailing reaction temperature and actual hydrogen ion concentration.

Further, since the solubility of sodium chlorate in the reaction medium increases with temperature while that of sodium chloride remains substantially the same, or decreases, then it would appear to be desirable to operate at as high a temperature as possible, thereby to obtain the highest chlorate ion to chloride ion mole ratio and hence the highest GA%$ClO_2$.

However, it is known that chlorine dioxide decomposes at elevated temperatures. Thus, it would have been expected that the efficiency of chlorine dioxide production could be increased with increasing temperature as a result of the increasing mole ratio of chlorate ions to chloride ions at saturation up to the decomposition temperature at which point the efficiency would abruptly decline. It was surprisingly found, however, that the efficiency does not increase and decrease in this manner but rather the efficiency increases with increasing temperature to a peak and then declines slowly as the temperature is further increased.

The reason for this unexpected observation is not fully understood but it is theorized that there is some mechanism whereby reaction according to equation (2) becomes more active at high temperatures, negating the beneficial effects of decreased mole ratio of chlorate ion to chloride ion.

Hence, a balance of temperature and chlorate ion to chloride ion mole ratio must be sought for the achievement of high efficiency of production of chlorine dioxide, as measured by the GA% $ClO_2$ present in the recovered gas mixture.

Conversion of sodium chlorate to chlorine dioxide of 39 to 50 GA% $ClO_2$ is considered acceptable in the present invention. In order to achieve such an efficiency from a chlorine dioxide-producing reaction medium saturated with respect to sodium chloride and substantially saturated with respect to sodium chlorate, it is essential that the temperature of the reaction medium be between about 30° and about 85° C with the mole ratio of chlorate ions to chloride ions being between about 5.9:1 and about 2.1:1.

It is preferred that the G.A.% $ClO_2$ exceed about 40, requiring temperatures of about 50° to about 80° C and mole ratios of chlorate ions to chloride ions of about 5.3:1 to about 2.7:1. More preferably, the temperature of the reaction medium is from about 60° to 75° C and the mole ratio is from about 4.8:1 to about 3.3:1. The optimum conditions for obtaining the maximum efficiency are a temperature from about 65° to 70° C and a mole ratio of chlorate ions to chloride ions of about 4.0:1 to about 3.3:1.

Operation of the reaction medium at the saturation point of both sodium chlorate and sodium chloride may lead to deposition of some sodium chlorate along with the sodium chloride upon minor fluctuations in temperature. The presence of such sodium chlorate in the solid phase removed from the reaction vessel may be detrimental and hence it may be desirable to operate with the reaction medium slightly undersaturated with respect to sodium chlorate to prevent such deposition. Generally, the reaction medium is at least 85% saturated with sodium chlorate, preferably about 90% saturated, and the expression "substantially saturated" as applied to the sodium chlorate concentration is intended to include these values.

Sodium chlorate and hydrochloric acid are continuously fed to the reaction medium at rates such as to provide substantially steady state conditions in the reaction medium.

The sodium chlorate generally is fed as an aqueous solution thereof, preferably formed on site by electrolysis of a sodium chloride solution.

The hydrochloric acid may be any desired concentration, but preferably has a concentration of about 30 to about 37.5% HCl to limit the quantity of water introduced to the reaction medium from that source. It is also possible to feed hydrogen chloride gas to the reaction medium, if desired.

At any given reaction medium temperature and reaction medium chlorate ion and chloride ion concentrations, the total acid normality is fixed and cannot be varied without varying the other parameters.

The feed of hydrochloric acid or hydrogen chloride to the reaction medium imparts to the reaction medium a certain "acidity" which remains substantially constant. The term "acidity" has a number of possible interpretations but the usual meaning is the total acidity present as determined by titration with a solution of a known concentration of sodium hydroxide to a preselected pH end point. This determination of acidity is expressed in terms of normality, i.e. the equivalent number of gram atoms of hydrogen ion per liter of solution corresponding to the value titrated. Acidity determined in this manner is referred to herein as "total acid normality".

As set forth in detail in copending U.S. application Ser. No. 770,361 filed Feb. 22, 1977 by Richard Swindells and assigned to the assignee of this application, in aqueous systems in which anions of multi-basic acids are present, the total acid normality does not represent the concentration of hydrogen ions available for reaction, due to the formation of anionic species containing "bound hydrogen ions". The concentration of hydrogen ions available for reaction is referred to herein as the "actual hydrogen ion concentration". The bound hydrogen ions, although not present in the solution as dissociated or actual hydrogen ions, will be included in the calculated normality derived from the value titrated in the determination of the total acidity.

The total acid normality, therefore, is not necessarily a true measure of the "actual hydrogen ion concentration", i.e. the concentration of hydrogen ions available for reaction. The term "actual hydrogen ion concentration" as used herein, is the value determined by a pH meter calibrated on an 0.1 normal solution of hydrochloric acid based on the assumption that such a solution is 100% dissociated at this concentration. This value may be expressed as pH or in terms of normlity, i.e. the number of gram atoms of actual hydrogen ions per liter of solution corresponding to the determined pH.

It is the actual hydrogen ion concentration which determines the rate of reaction of sodium chlorate according to the above equations (1) and (2) rather than the total acid normality. Where the chlorine dioxide system contains only chlorate, chloride and hydrogen ions, than the actual hydrogen ion concentration is substantially the same as the total acid normality of the reaction medium and acid normalities in the region of about 0.05 to about 0.3 normal have been found to be operable to achieve satisfactory chlorine dioxide production rates.

When anions of multibasic acids are present, it is necessary for satisfactory chlorine dioxide production rates that the actual hydrogen ion concentration be in the range of about 0.05 to about 0.3 normal. Hence, irrespective of the presence or absence of anions of multibasic acids, the actual hydrogen ion concentration of the reaction medium in this invention is maintained in the range of about 0.05 to about 0.3 normal.

The sodium chloride deposited in the reaction zone and removed therefrom may be used to form sodium chlorate solution for recycle to the reaction zone by electrolysis of an aqueous solution thereof.

The sodium chloride also may be used to form sodium hydroxide and chlorine for a bleach plant by electrolysis of an aqueous solution thereof. If it is desired to proceed by neither of these electrolysis procedures, the sodium chloride may be discarded.

As in the procedure of Canadian Pat. No. 913,328, the volume of reaction medium is maintained substantially constant by balancing the water removed as steam with the water introduced with the sodium chlorate solution and the hydrochloric acid and formed in the reaction medium. Small quantities of water may be removed entrained in the sodium chloride, but subsequently are returned.

The steam dilutes the chlorine dioxide and chlorine formed in the reaction medium and the resulting gas mixture is removed from the reaction zone. Since the reaction zone does not operate under a perfect vacuum, an air bleed is provided, so that the gaseous mixture removed from the reaction zone contains a small concentration of air along with the steam, chlorine dioxide and chlorine.

The volume ratio of steam to chlorine dioxide in the gas mixture recovered from the reaction zone may vary widely, although in the present invention it is always maintained at a value greater than that below which substantial decomposition of chlorine dioxide occurs.

The chlorine dioxide is recovered from the gaseous mixture as an aqueous solution thereof, which may be used, for example, in wood pulp bleaching operations.

It is known from Canadian Pat. No. 969,735 to improve the efficiency of reduction of sodium chlorate by hydrochloric acid to chlorine dioxide by using various metallic catalysts, such as silver ions, manganese ions, arsenic ions, vanadium pentoxide and dichromate ions.

As mentioned above, the efficiency of chlorine dioxide production in this invention is improved by control of the operating parameters of the reaction medium. If desired, the efficiency of chlorine dioxide production may be further increased, typically up to the equivalent of 50 GA% $ClO_2$ by the presence of one or more of such catalysts.

In some instances, however, it may be undesirable to include such catalysts in the reaction medium. For example, where silver ions are present and where the sodium chloride deposited in and removed from the reaction zone is used to form an aqueous solution thereof which is electrolyzed to form chlorate for recycle to the chlorine dioxide reaction zone, silver entrained in the deposited sodium chloride catalyses decomposition of the electrolysis products to oxygen.

DESCRIPTION OF PREFERRED EMBODIMENTS

Figure 1:
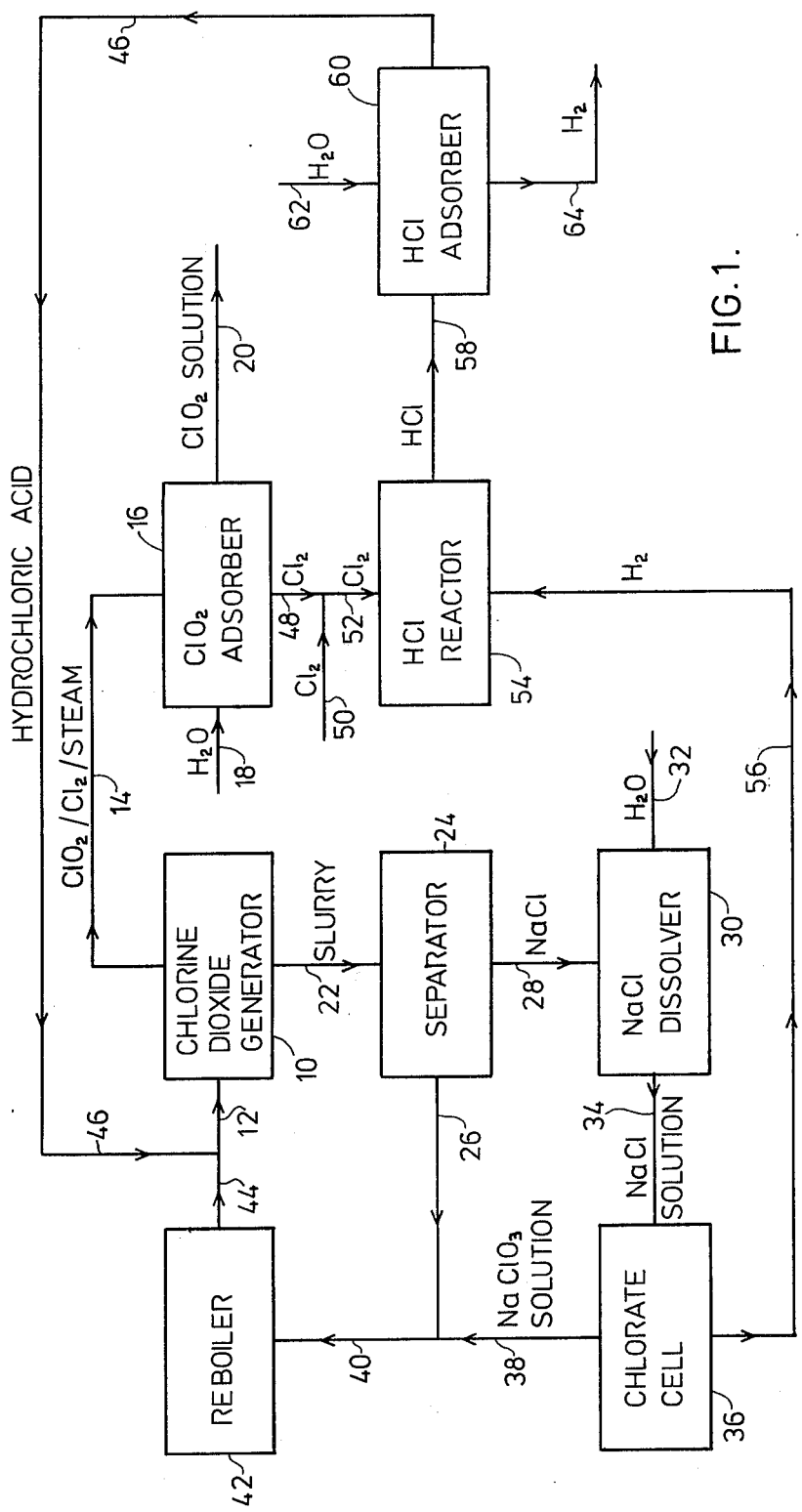
FIG. 1 of the drawing represents a chlorine dioxide-producing system in accordance with one embodiment of the present invention.

Referring now to FIG. 1 of the drawings, a chlorine dioxide generator 10 contains a reaction medium containing sodium chlorate, hydrochloric acid and saturated with sodium chloride. The generator takes the form of a single-chambered generator-evaporator-crystallizer reaction vessel. The reaction medium is maintained at its boiling point at the prevailing absolute pressure thereon while the generator 10 is maintained under the subatmospheric pressure in any convenient manner.

Solium chlorate and hydrochloric acid are fed continuously to the generator 10 by line 12 to maintain the concentrations thereof in the reaction medium substantially constant, with the concentration of sodium chlorate being maintained close to its saturation concentration at the prevailing temperature, the hydrochloric acid feed providing a free hydrogen ion concentration of about 0.1 normal in the reaction medium.

The boiling of the reaction medium results in evaporation of water therefrom to form a gaseous mixture with the chlorine dioxide and chlorine formed by the reduction of the sodium chlorate by hydrochloric acid. The quantity of water removed as steam preferably is substantially equal to the quantity of water introduced to the generator 10 in the feed stream 12 plus the quantity of water formed in the reaction medium, so that the liquid volume in the chlorine dioxide generator remains substantially constant.

The gaseous mixture is removed from the generator 10 by line 14. An air bleed (not shown) is provided to provide the desired subatmospheric pressure in the generator, so that the gaseous mixture in line 14 contains a small concentration of air. The gaseous mixture in line 14 is passed to a chlorine dioxide adsorber 16 wherein the gas mixture, which may initially be partially condensed, is contacted with water fed by line 18 to cause condensation of the steam and the formation of an aqueous solution of chlorine dioxide containing some dissolved chlorine. The aqueous chlorine dioxide solution is removed by line 20 for use in bleaching pulp in the bleach plant of a pulp mill operation.

The concentration of chlorine present in the chlorine dioxide solution may be decreased to a low level, if desired, such as, by air stripping the solution prior to its use in the bleach plant.

Sodium chloride formed by the reactions in the generator 10 precipitates continuously from the reaction medium in the generator 10. Solid sodium chloride is removed as a slurry thereof with reaction medium from the generator 10 by line 22. The slurry is passed to a separator 24 wherein the solid phase is separated substantially from the liquid phase, the separated liquid phase passing from the separator 24 by line 26.

The solid sodium chloride, after washing to remove entrained reaction medium, the wash water from the latter step being added to line 26, is passed by line 28 to a sodium chloride dissolver 30 wherein the sodium chloride is dissolved in water fed by line 32 to form an aqueous solution thereof in line 34.

In the embodiment of FIG. 1, the aqueous sodium chloride solution is passed to a chlorate cell 36 wherein part of the sodium chloride is electrolyzed to form sodium chlorate. The resulting aqueous solution of sodium chlorate and sodium chloride may be fed as such to the generator 10, the sodium chloride recycling as a dead load between the generator 10 and the chlorate cell 36.

Alternatively, sodium chlorate may be crystallized from the aqueous solution of sodium chlorate and sodium chloride resulting from the chlorate cell 36 with the crystallized sodium chlorate being formed into an aqueous solution for feed to the generator 10, and the sodium chloride being recycled to the chlorate cell 36 for formation of more sodium chlorate.

Sodium dichromate is conventionally used to enhance the efficiency of chlorate production in the chlorate cell 36. Where the sodium chlorate and sodium chloride solution is fed to the gnerator 10, as in the illustrated embodiment, dissolved sodium dichromate also is fed to the generator. This dichromate feed results in an increase in the concentration of sodium dichromate until the reaction medium is saturated with sodium dichromate, and sodium dichromate crystallizes from the reaction medium along with the sodium chloride.

When the precipitated sodium chloride is fed to the chlorate cell, the aqueous solution thereof also will contain the precipitated dichromate. Thus, under steady state conditions in which chlorate cell liquor is fed to the generator and sodium dichromate is used in the chlorate cell, the reaction medium is saturated with respect to sodium dichromate and the sodium dichromate required in the chlorate cell is fed to the chlorate cell with the sodium chloride solution formed from the generator precipitate.

The sodium chlorate solution resulting from the chlorate cell 36 passes by lines 38 and 40 to a reboiler 42 after mixing with the recycle reaction medium in line 26.

The sodium chlorate solution is heated to the required reaction temperature in the reboiler 42 and is discharged therefrom by line 44. The heated sodium chlorate solution in line 44 is mixed with hydrochloric acid fed by line 46 prior to forwarding of the reactants fed by line 12 to the chlorine dioxide generator 10. The recycling dissolved sodium chloride and sodium dichromate, if present, are immediately crystallized from the reaction medium due to the saturated nature of the reaction medium with respect to sodium chloride and sodium dichromate, if used, in the chlorate cell.

Chlorine gas also results from the chlorine dioxide adsorber 16 and is removed therefrom by line 48. A vacuum pump, or other suitable means, may be provided in line 48 to maintain the subatmospheric pressure in the chlorine dioxide generator 10.

The chlorine gas in line 48 may be mixed with additional chlorine gas in line 50, such as from a causticchlorine cell to provide a combined chlorine feed line 52 to a hydrogen chloride reactor 54.

Hydrogen gas formed in the chlorate cell 36 is forwarded by line 56 to the hydrogen chloride reactor 54 wherein part thereof reacts with the chlorine feed in line 52 to form hydrogen chloride in line 58. Alternatively, natural gas may be reacted with the chlorine to form hydrogen chloride.

Hydrogen gas formed in the chlorate cell 36 is forwarded by line 56 to the hydrogen chloride reactor 54 wherein part thereof reacts with the chlorine feed in line 52 to form hydrogen chloride in line 58.

The hydrogen chloride is passed to a hydrogen chloride absorber 60 wherein the hydrogen chloride is adsorbed in water fed by line 62 to form the hydrochloric acid feed line 46. Excess hydrogen is vented by line 64.

The embodiment of FIG. 1, therefore, integrates the chlorine dioxide generator with a chlorate cell to provide a system which requires only chlorine, water and energy to provide chlorine dioxide and hydrogen, in accordance with equation (4):

$$Cl_2 + 4H_2O \rightarrow 2ClO_2 + 4H_2 \qquad (4)$$

Figure 2:
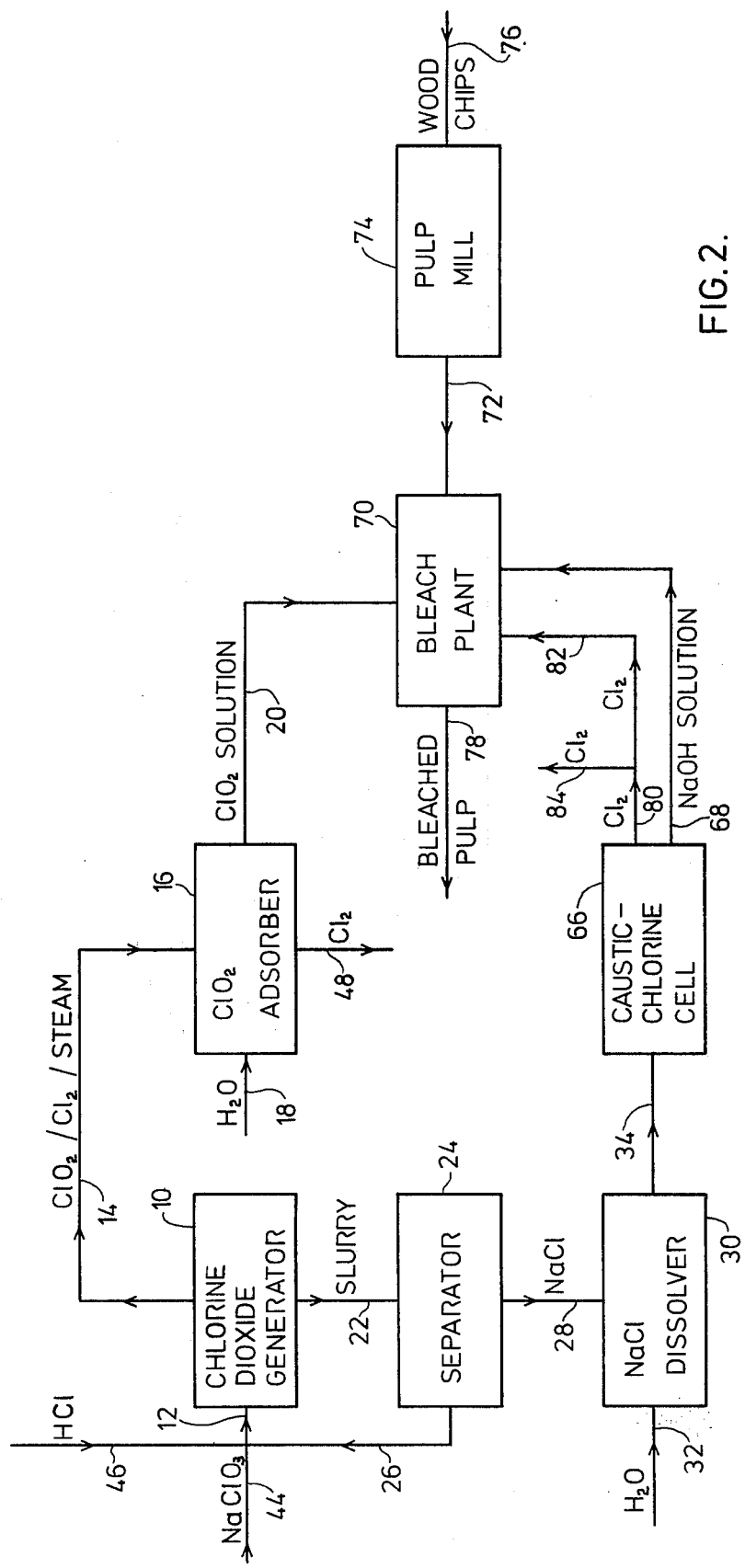
FIG. 2 represents a chlorine dioxide-producing system in accordance with another embodiment of the invention.

Turning now to FIG. 2, this figure illustrates an embodiment wherein the sodium chlorate and hydrochloric acid feeds are prepared from purchased materials or formed on site from chemicals other than the sodium chloride formed in the generator 10.

A number of elements in the embodiment of FIG. 2 are common to the embodiment of FIG. 1 and have been designated by the same reference numerals. Reference may be had to the description thereof above with reference to the embodiment of FIG. 1.

In this embodiment, the aqueous sodium chloride solution in line 34 is passed to a caustic-chlorine cell 66 wherein the sodium chloride solution is electrolyzed to form chlorine and sodium hydroxide solution.

The resultant sodium hydroxide solution is passed by line 68 to a bleach plant 70. The bleach plant 70 receives unbleached pulp by line 72 from a pulp mill 74 wherein wood chips fed by line 76 or other cellulosic fibrous material, is pulped with pulping liquor of any desired form.

In the bleach plant 70, the unbleached pulp is subjected to a series of bleaching and purification steps to result in bleached pulp which is removed from the bleach plant 70 by line 78. The sodium hydroxide solution in line 68 is used in the purification steps.

The chlorine dioxide solution in line 20 resulting from the chlorine dioxide adsorber 16 also is passed to the bleach plant 70 for use in one or more of the bleaching steps carried out therein. The chlorine formed in the caustic-chlorine cell 66 at least partially also may be passed to the bleach plant 70 by lines 80 and 82, the remainder thereof being removed by line 84.

The sequence of bleaching and caustic extraction steps carried out in the bleach plant 70 may be varied. For example, the CEDED, D/CEDED or DEDED sequences may be used.

The chlorine in line 48, together with the chlorine in line 84, may be used in the formation of the hydrochloric acid feed for the generator 10 in line 46.

The embodiment of FIG. 2 illustrates, therefore, an alternative utilization for the sodium chloride removed from the generator 10 to that illustrated in the embodiment of FIG. 1.

EXAMPLES

Example 1

A single-chambered chlorine dioxide generator fed with streams of sodium chlorate solution and hydrochloric acid was operated continuously under a subatmospheric pressure at a boiling point of the reaction medium of about 63° C. The reaction medium was maintained saturated with sodium chloride at all times and the mole ratio of chloride ions to chlorate ions was varied by varying the concentration of sodium chlorate in the reaction medium, by suitable control of the feed. The efficiency of conversion of chlorate to chlorine dioxide, expressed as GA%ClO$_2$, was determined for each mole ratio and the results were plotted and appear in FIG. 4.

Figure 4:
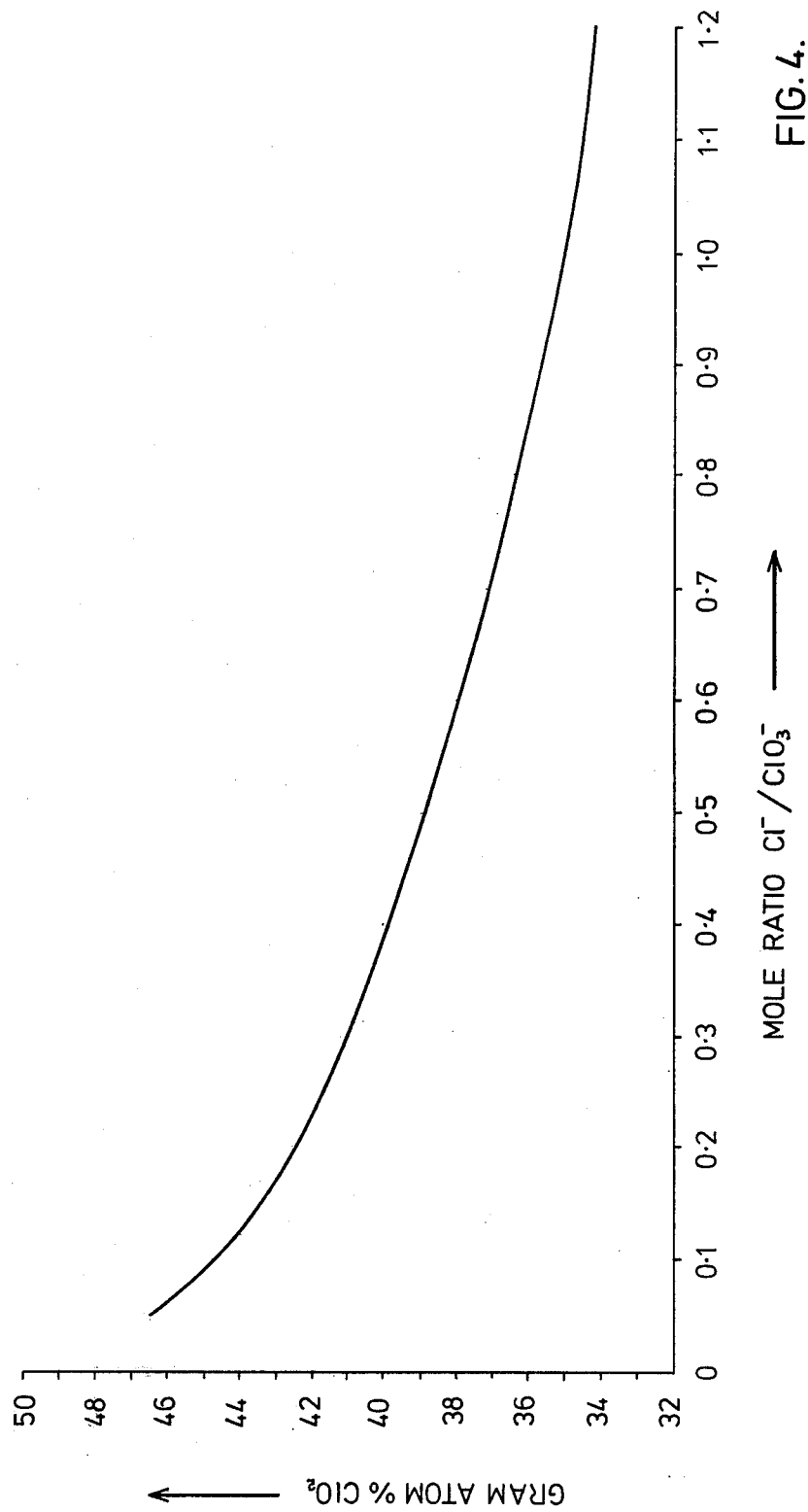
FIG. 4 is a graphical representation of the variation of efficiency of chlorine dioxide production with chlorate ion to chloride ion mole ratio at a given temperature.

As may be seen from FIG. 4, the GA%ClO$_2$ formed increased with increasing mole ratio of chlorate ions to chloride ions. From these values and the known solubilities of sodium chlorate and sodium chloride in water at various temperatures, the approximate theoretical maximum GA%ClO$_2$ based on the chlorate ion to chloride ion mole ratio at those temperatures can be extrapolated.

The following Table provides the solubility data and extrapolation:

TABLE

| Temp. °C | NaClO$_3$ M* | NaCl M* | ClO$_3^-$/Cl$^-$ | GA%ClO$_2$ |
|---|---|---|---|---|
| 40 | 5.54 | 2.26 | 2.4 | 39.7 |
| 50 | 6.24 | 2.14 | 2.9 | 40.5 |
| 60 | 6.95 | 1.98 | 3.6 | 41.3 |
| 70 | 7.63 | 1.71 | 4.5 | 42.2 |
| 80 | 8.28 | 1.44 | 5.9 | 43.1 |
| 90 | 9.03 | 1.55 | 7.7 | 44.0 |
| 100 | 9.82 | 0.72 | 14.3 | 45.5 |

*These values are the solubilities in water. The presence of the hydrochloric acid, chlorine dioxide and chlorine in the reaction medium will decrease these values slightly for the chlorine dioxide producing reaction medium.

EXAMPLE II

A further series of experiments was performed at temperatures of 70° C and above with the reaction medium in each case being maintained at the saturation with sodium chlorate and sodium chloride. The GA%ClO$_2$ produced was determined for each temperature and the results are represented graphically in FIG. 5.

Figure 5:
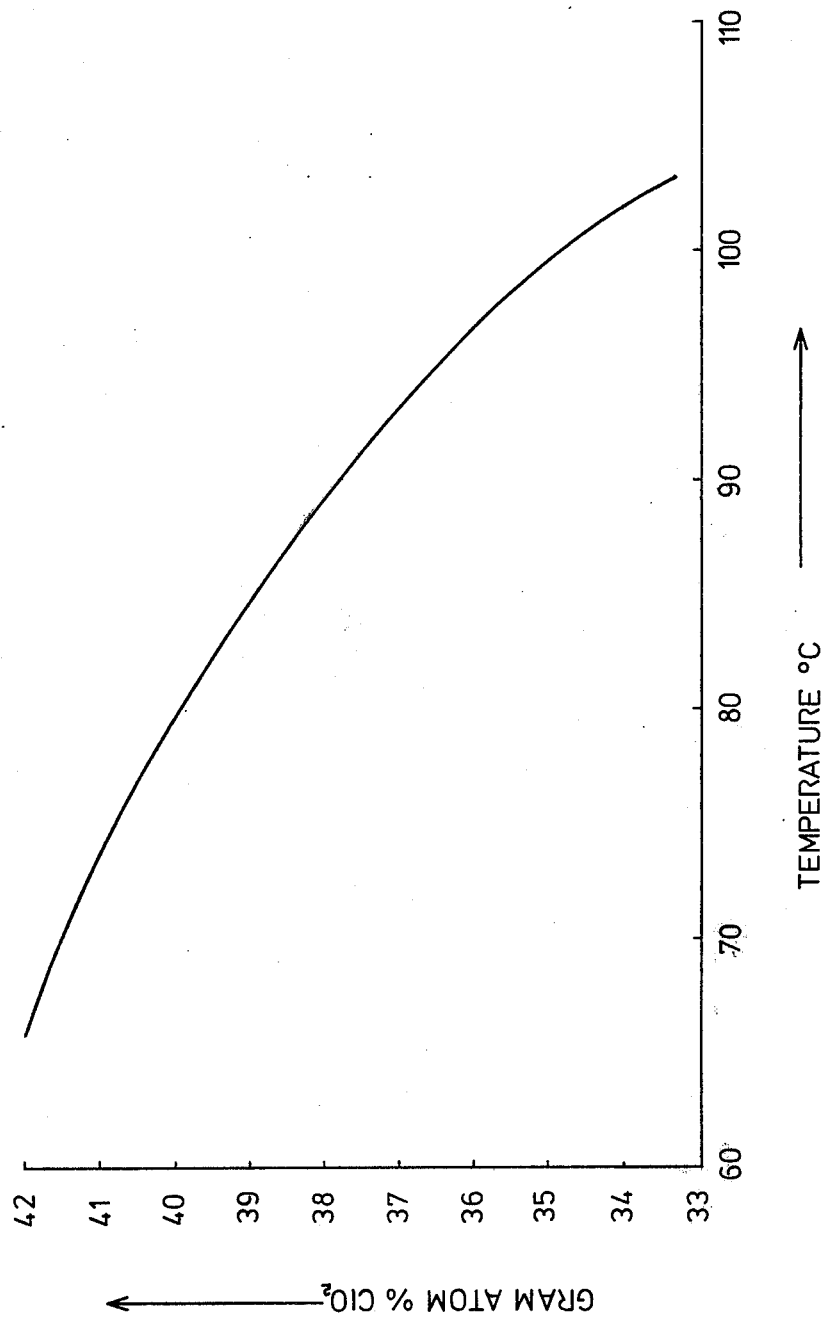
FIG. 5 is a graphical representation of the GA%-$ClO_2$ produced at various temperatures.

It can be seen from FIG. 5 that the GA%ClO$_2$ recoverable decreases rapidly with temperature above about 85° C even though the mole ratio of chlorate ion to chloride ion increases.

Figure 6:
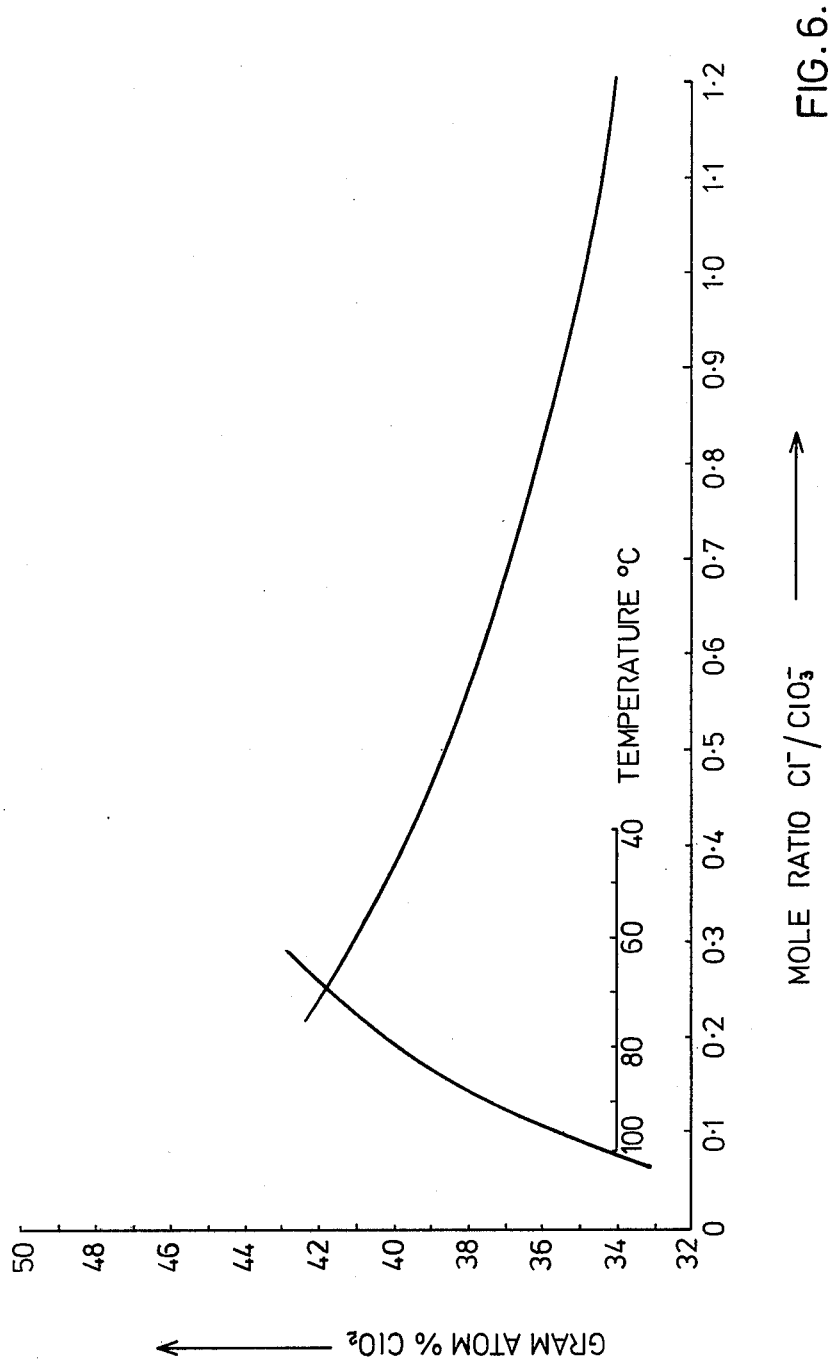
FIG. 6 is a combined graphical representation of the variation of GA% $ClO_2$ produced with variations in both chlorate ion to chloride ion mole ratio and temperature.

The interrelationship of the two variables of temperature and mole ratio and their effect on GA%ClO$_2$ recoverable is plotted in FIG. 6, the graph being arrived at by combination of the plots of FIGS. 4 and 5. As may be seen in FIG. 6, there is quite a distinct peak of GA%ClO$_2$ recoverable at 41.7% using a chlorate ion to chloride ion mole ratio of 4.0:1 at saturation by both NaClO$_3$ and NaCl and 67° to 68° C.

It may also be seen from the graph of FIG. 6 that values in narrow ranges of temperature and mole ratio must be chosen for high efficiency production of chlorine dioxide.

To prevent deposition of sodium chlorate from the reaction medium, the reaction medium may be operated at 90% of saturation by sodium chlorate causing a conequent decrease in the mole ratio of about 12% and loss of GA%ClO$_2$ of about 0.6%ClO$_2$. Under these conditions, therefore, the maximum mole ratio GA%ClO$_2$ attainable is 41.1% ClO$_2$ at a temperature of 67° C and a chlorate ion to chloride ion mole ratio of 3.6:1.

SUMMARY

The present invention, therefore, provides a high efficiency chlorine dioxide producing process based on reduction of sodium chlorate with hydrochloric acid. Modifications are possible within the scope of the invention.

What we claim is:

1. In a method of producing chlorine dioxide from sodium chlorate, which comprises:
   (a) establishing in a reaction zone an aqueous reaction medium containing dissolved quantities of sodium chlorate, sodium chloride and hydrochloric acid, said aqueous reaction medium being substantially saturated with sodium chloride,
   (b) continuously feeding an aqueous solution of sodium chlorate to said aqueous reaction medium,
   (c) continuously feeding hydrochloric acid or hydrogen chloride to said aqueous reaction medium,
   (d) continuously maintaining said reaction medium at its boiling point at the absolute pressure thereon and continuously maintaining said reaction zone under a subatmospheric pressure sufficient to maintain said reaction medium at its boiling point,
   (e) continuously generating chlorine dioxide, chlorine and sodium chloride in said reaction medium,
   (f) continuously removing from said reaction zone a gaseous mixture of chlorine dioxide, chlorine and steam wherein the volume ratio of steam to chlorine dioxide is greater than that below which substantial decomposition of chlorine dioxide occurs,
   (g) continuously depositing said generated sodium chloride from said reaction medium in said reaction zone,
   (h) removing said deposited sodium chloride from said reaction zone, and
   (i) continuously maintaining the volume of liquid in said reaction zone substantially constant,
   the improvement which comprises:
   (j) continuously feeding said aqueous solution of sodium chlorate to said aqueous reaction medium in sufficient quantity to maintain a concentration of sodium chlorate in said reaction medium substantially saturating the same and to maintain said aqueous reaction medium at a mole ratio of chlorate ions to chloride ions of about 5.9:1 to about 2.1:1,
   (k) continuously maintaining the actual hydrogen ion concentration in said reaction medium in the range of about 0.05 to about 0.3 normal, and
   (l) continuously maintaining said boiling point of said reaction medium in the range of about 30° to about 85° C and continuously maintaining said subatmospheric pressure on said reaction zone in the range of about 20 to about 400 mm Hg,
   said improvement resulting in the production of chlorine dioxide from sodium chlorate at an efficiency equivalent to about 39 to about 50 Gram Atom Percent ClO$_2$.

2. The method of claim 1 wherein said aqueous reaction medium contains substantially no dissolved quantities of catalytically-acting metal ions.

3. The method of claim 1 wherein said aqueous reaction medium contains an efficiency improving quantity of at least one catalyst selected from vanadium pentoxide, silver ions, manganese ions, arsenic ions and dichromate ions.

4. The method of claim 1 wherein said reaction temperature is about 50° to about 80° C and said mole ratio is about 5.3:1 to about 2.7:2.7.

5. The method of claim 1 wherein said reaction temperature is about 60° to about 75° C and said mole ratio is about 4.8:1 to about 3.3:1.

6. The method of claim 1 wherein said reaction temperature is about 65° to about 70° C and said mole ratio is about 4.0:1 to about 3.3:1.

7. The method of claim 1 including the further steps of forming said removed sodium chloride into an aqueous solution thereof, electrolyzing said aqueous solution to form an aqueous solution of sodium chlorate and hydrogen gas, and utilizing said latter aqueous solution fo sodium chlorate as said sodium chlorate solution continuously fed to said reaction medium.

8. The method of claim 7 including the further steps of reacting part of said hydrogen gas with chlorine to form hydrogen chloride for use as said feed of hydrogen chloride or in said feed of hydrochloric acid to said reaction medium.

9. The method of claim 7 wherein said aqueous solution of sodium chloride electrolyzed also contains dissolved quantities of sodium dichromate, said aqueous reaction medium is saturated also with respect to sodium dichromate, and sodium dichromate is precipitated from said reaction medium along with said sodium chloride.

10. The method of claim 1 wherein said actual hydrogen ion concentration in said reaction medium is about 0.1 normal.

* * * * *

UNITED STATES PATENT OFFICE
CERTIFICATE OF CORRECTION

Patent No. 4,075,308                      Dated February 21, 1978

Inventor(s) W. Howard Rapson et al.

It is certified that error appears in the above-identified patent and that said Letters Patent are hereby corrected as shown below:

Column 10, line 62, "2.7:2.7" should read -- 2.7:1. --

Signed and Sealed this

Twenty-seventh Day of June 1978

[SEAL]

Attest:

RUTH C. MASON  
Attesting Officer

DONALD W. BANNER  
Commissioner of Patents and Trademarks